US009919599B2

(12) United States Patent
Fuchiwaki et al.

(10) Patent No.: US 9,919,599 B2
(45) Date of Patent: Mar. 20, 2018

(54) VEHICLE ACTION SUGGESTION DEVICE AND METHOD (71) Applicant: HONDA MOTOR CO., LTD., Tokyo (JP)

(72) Inventors: Yosuke Fuchiwaki, Wako (JP); Keizo Yamanaka, Wako (JP); Naoki Miura, Wako (JP); Yasunori Nihei, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/131,751

(22) Filed: Apr. 18, 2016

(65) Prior Publication Data

US 2016/0309440 A1 Oct. 20, 2016

(30) Foreign Application Priority Data

Apr. 17, 2015 (JP) .................................. 2015-084883

(51) Int. Cl.
*H04W 4/00* (2009.01)
*B60K 35/00* (2006.01)
*H04W 4/04* (2009.01)

(52) U.S. Cl.
CPC ............. *B60K 35/00* (2013.01); *H04W 4/046* (2013.01)

(58) Field of Classification Search
CPC .............................. B60K 35/00; H04W 4/046
USPC ...................................................... 455/435.1
See application file for complete search history.

(56) References Cited

U.S. PATENT DOCUMENTS

| 8,311,719 | B2* | 11/2012 | Miura ................... | B60W 30/16 701/96 |
| 8,612,410 | B2* | 12/2013 | Meredith ............ | G06F 17/3087 455/456.1 |
| 9,251,631 | B2* | 2/2016 | Thompson ............. | G07C 5/008 |
| 2010/0280956 | A1* | 11/2010 | Chutorash .............. | G06Q 20/20 705/64 |
| 2012/0162423 | A1* | 6/2012 | Xiao ..................... | B60R 25/305 348/148 |
| 2013/0304347 | A1* | 11/2013 | Davidson ............. | G06Q 10/083 701/99 |
| 2013/0304349 | A1* | 11/2013 | Davidson ............. | G08G 1/0112 701/99 |
| 2013/0316707 | A1* | 11/2013 | Azuma ............... | H04M 1/6083 455/435.1 |
| 2014/0199962 | A1* | 7/2014 | Mohammed .......... | H04M 15/70 455/406 |
| 2014/0309789 | A1* | 10/2014 | Ricci ...................... | B60Q 1/00 700/276 |
| 2014/0309864 | A1* | 10/2014 | Ricci ..................... | H04W 48/04 701/36 |

(Continued)

FOREIGN PATENT DOCUMENTS

JP 2002-196665 A 7/2002

*Primary Examiner* — Marceau Milord
(74) *Attorney, Agent, or Firm* — Chip Law Group (57) ABSTRACT A terminal detection unit detects a mobile terminal located inside a vehicle. An action history information generation unit and storage unit associate the mobile terminal detected by the terminal detection unit and an action of the vehicle associated with each other and store them as action history information. An action suggestion unit searches the action history information stored in the storage unit for the action associated with the mobile terminal detected by the terminal detection unit and suggests the found action to a passenger of the vehicle.

8 Claims, 6 Drawing Sheets (56) References Cited

U.S. PATENT DOCUMENTS

| | | | | |
|---|---|---|---|---|
| 2014/0309871 A1* | 10/2014 | Ricci | ................... | B60Q 1/00 |
| | | | | 701/36 |
| 2014/0309872 A1* | 10/2014 | Ricci | ................... | H04W 48/04 |
| | | | | 701/36 |
| 2015/0024780 A1* | 1/2015 | Hong | ................... | H04W 4/028 |
| | | | | 455/456.2 |
| 2015/0032505 A1* | 1/2015 | Kusukame | ......... | G06Q 30/0201 |
| | | | | 705/7.31 |
| 2015/0133084 A1* | 5/2015 | Baek | ................... | G06F 3/048 |
| | | | | 455/411 |
| 2015/0248795 A1* | 9/2015 | Davidson | ............... | G01C 21/34 |
| | | | | 701/1 |
| 2015/0326404 A1* | 11/2015 | Greszczuk | ........ | H04L 12/40006 |
| | | | | 375/219 |
| 2015/0326704 A1* | 11/2015 | Ko | ................... | H04M 1/7253 |
| | | | | 455/456.3 |
| 2016/0006577 A1* | 1/2016 | Logan | ................ | H04L 12/2827 |
| | | | | 700/276 |

\* cited by examiner

FIG. 2

| DEVICE 61 | CATEGORY 62 | GENERAL ITEM 63 | MIDDLE ITEM 64 | DETAIL ITEM 65 | DEVICE LOCATED TOGETHER 66 | DATE AND TIME TREND 67 | TIMES 68 |
|---|---|---|---|---|---|---|---|
| A | POI | RESTAURANT | RAMEN SHOP | X RAMEN SHOP | B:5 C:2 | WEEKDAY, NOON | 5 |
| A | POI | RESTAURANT | RAMEN SHOP | Y RAMEN SHOP | B:1 | WEEKDAY, NOON | 2 |
| A | POI | RESTAURANT | SUSHI | Z SUSHI | C:2 | WEEKDAY, NIGHT | 3 |
| A | ROUTE | PRIORITIZING EXPRESSWAY | | | B:2 C:1 | | 4 |
| A | ROUTE | MANUAL CONGESTION AVOIDANCE REROUTE | | | | | 3 |
| A | STOP LOCATION | SHOPPING | SWEETS | W CAKE SHOP | | HOLIDAY, EVENING | 5 |
| A | STOP LOCATION | SHOPPING | SHOPPING MALL | V MALL | B:2 C:2 | HOLIDAY, NOON | 2 |
| B | ⋮ | | | | | | |
| C | ⋮ | | | | | | |

VEHICLE ACTION SUGGESTION DEVICE AND METHOD

CROSS REFERENCES TO RELATED APPLICATIONS

The present application claims priority under 35 U.S.C. § 119 to Japanese Patent Application No. 2015-084883, filed Apr. 17, 2015, entitled "Vehicle Action Suggestion Device and Method." The contents of this application are incorporated herein by reference in their entirety.

BACKGROUND

1. Field

The present disclosure relates to vehicle action suggestion device and method that suggest an optimal action to a passenger of a vehicle.

2. Description of the Related Art

Recently, devices that suggest an optimal action to a passenger of a vehicle have been developed. For example, the related art discloses a device that suggests destination information in accordance with a preference of a passenger of a vehicle via a vehicle onboard unit (a navigation unit) (see, for example, Japanese Unexamined Patent Application Publication No. 2002-196665, paragraphs [0026], [0027], and [0052] to [0060]). In this device, the vehicle onboard unit first transmits a history save instruction to mobile terminals of passengers. Each mobile terminal that has received the history save instruction stores position information of a visit place that the passenger visited outside of the vehicle. When each passenger comes back to the vehicle, the vehicle onboard unit transmits a data transmission instruction to the passenger's mobile terminal. Each mobile terminal that has received the data transmission instruction transmits the position information of the stored visit place to the vehicle onboard unit. The vehicle onboard unit transmits the information of the visit place to a service center, and the service center accumulates the information of the visit places. Then, upon an operation of the vehicle onboard unit in which a request for information is made by a passenger, the service center provides information of a place that the passengers have not yet visited.

In the device of the related art described above, after a communication line has been established between a vehicle onboard unit and a passenger's mobile terminal, various instructions and various pieces of information are transmitted to and received from the vehicle onboard unit and the passenger's mobile terminal. However, the establishment of a communication line takes labor. Further, in view of protection of personal information, some passengers may mind providing information (position information of a visit place) to a vehicle onboard unit.

SUMMARY

In view of the background described above, the present application describes a vehicle action suggestion device and method that can suggest optimal information to a passenger of a vehicle without establishing a communication line between the vehicle and a passenger's mobile terminal.

A vehicle action suggestion device according to the present application includes a terminal detection unit that detects a mobile terminal located inside a vehicle; a storage unit that stores action history information in which the mobile terminal detected by the terminal detection unit is associated with an action of the vehicle; and an action suggestion unit that searches the action history information stored in the storage unit for the action associated with the mobile terminal detected by the terminal detection unit and suggests the found action to a passenger of the vehicle.

In the vehicle action suggestion device described above, a mobile terminal detected inside a vehicle and an action of the vehicle are associated with each other and stored as action history information. Thus, when the same mobile terminal is detected in the subsequent time, an optimal action can be suggested to a passenger based on the stored action history information. Further, without personal information being provided after establishment of a communication line between a vehicle and a mobile terminal, the optimal action is suggested as long as a mobile terminal located inside the vehicle is detected. Thus, there is no need for establishment of a communication line between the vehicle and the mobile terminal resulting in less labor. Further, since personal information is not provided from the mobile terminal to the vehicle, personal information is protected.

The vehicle action suggestion device may further include a door opening/closing detection unit that detects an opening operation and/or a closing operation of a door of the vehicle, and the terminal detection unit may perform detection of the mobile terminal when an opening operation and/or a closing operation of the door is detected by the door opening/closing detection unit.

In this case, detection of a mobile terminal is again performed at the time of an opening/closing operation of a door when a set of passengers may be changed, the mobile terminal can be always accurately identified allowing a more optimal action to be suggested.

The vehicle action suggestion device may further include a terminal registration unit that registers the mobile terminal. The terminal detection unit may perform detection of the mobile terminal during a predetermined traveling time period on a predetermined time basis or on a predetermined traveling distance basis, the terminal registration unit may register the mobile terminal which has been detected by the terminal detection unit a predetermined number of times or more during the predetermined traveling time period, and the storage unit may store action history information in which the mobile terminal registered by the terminal registration unit is associated with the action of the vehicle.

In this case, detection of a mobile terminal is performed for a plurality of times, and a mobile terminal which has been detected the predetermined number of times or more is registered. The registered mobile terminal and the action of the vehicle are then associated with each other and stored as action history information. According to the device described above, when erroneous detection of a mobile terminal such as where a mobile terminal of a pedestrian or a mobile terminal within a neighboring vehicle is detected, such mobile terminal can be excluded from the registration. As a result, an accuracy of the action history information is improved and a storage capacity for storing the action history information can be saved.

The vehicle action suggestion device may further include a terminal registration unit that registers the mobile terminal. The terminal detection unit may perform detection of the mobile terminal during a predetermined traveling time period on a predetermined time basis or on a predetermined traveling distance basis, the terminal registration unit may register the mobile terminal which has been detected by the terminal detection unit a first predetermined number of times or more and whose number of being detected the first predetermined number of times or more is a second predetermined number of times or more during the predetermined traveling time period, and the storage unit may store action history information in which the mobile terminal registered by the terminal registration unit is associated with the action of the vehicle.

In this case, detection of a mobile terminal is performed for a plurality of times, and registration is performed for the mobile terminal which has been detected by the terminal detection unit the first predetermined number of times or more and whose number of being detected the first predetermined number of times or more is the second predetermined number of times or more. The registered mobile terminal and the action of the vehicle are then associated with each other and stored as action history information. Accordingly, a mobile terminal of a passenger who happened to ride in the vehicle can be excluded from the registration. As a result, an accuracy of the action history information is improved and a storage capacity for storing the action history information can be saved.

A vehicle action suggestion method according to the present application includes a terminal detection step for detecting a mobile terminal located inside a vehicle; a history storage step for associating the mobile terminal detected by the terminal detection step with an action of the vehicle to generate action history information and storing the action history information; and an action suggestion step for searching the action history information stored by the history storage step for the action associated with the mobile terminal detected by the terminal detection step and suggesting the found action to a passenger of the vehicle.

The vehicle action suggestion method may further include a door opening/closing detection step for detecting an opening operation and/or a closing operation of a door of the vehicle. The terminal detection step may perform detection of the mobile terminal when an opening operation and/or a closing operation of the door is detected by the door opening/closing detection step.

The vehicle action suggestion method may further include a terminal registration step for registering the mobile terminal. The terminal detection step may perform detection of the mobile terminal during a predetermined traveling time period on a predetermined time basis or on a predetermined traveling distance basis, the terminal registration step may perform the mobile terminal which has been detected by the terminal detection step for a predetermined number of times or more during the predetermined traveling time period, and the history storage step may associate the mobile terminal registered by the terminal registration step with the action of the vehicle to generate action history information and store the action history information.

The vehicle action suggestion method may further include a terminal registration step for registering the mobile terminal. The terminal detection step may perform detection of the mobile terminal during a predetermined traveling time period on a predetermined time basis or on a predetermined traveling distance basis, the terminal registration step may register the mobile terminal which has been detected by the terminal detection step a first predetermined number of times or more and whose number of being detected the first predetermined number of times or more is a second predetermined number of times or more during the predetermined traveling time period, and the history storage step may associate the mobile terminal registered by the terminal registration step with the action of the vehicle to generate action history information and store the action history information.

DESCRIPTION OF THE PREFERRED EMBODIMENTS

A vehicle action suggestion device according to preferred embodiments of the present application will be described below with reference to the accompanying drawings.

Configuration of Vehicle Action Suggesting Device 12

Figure 1:
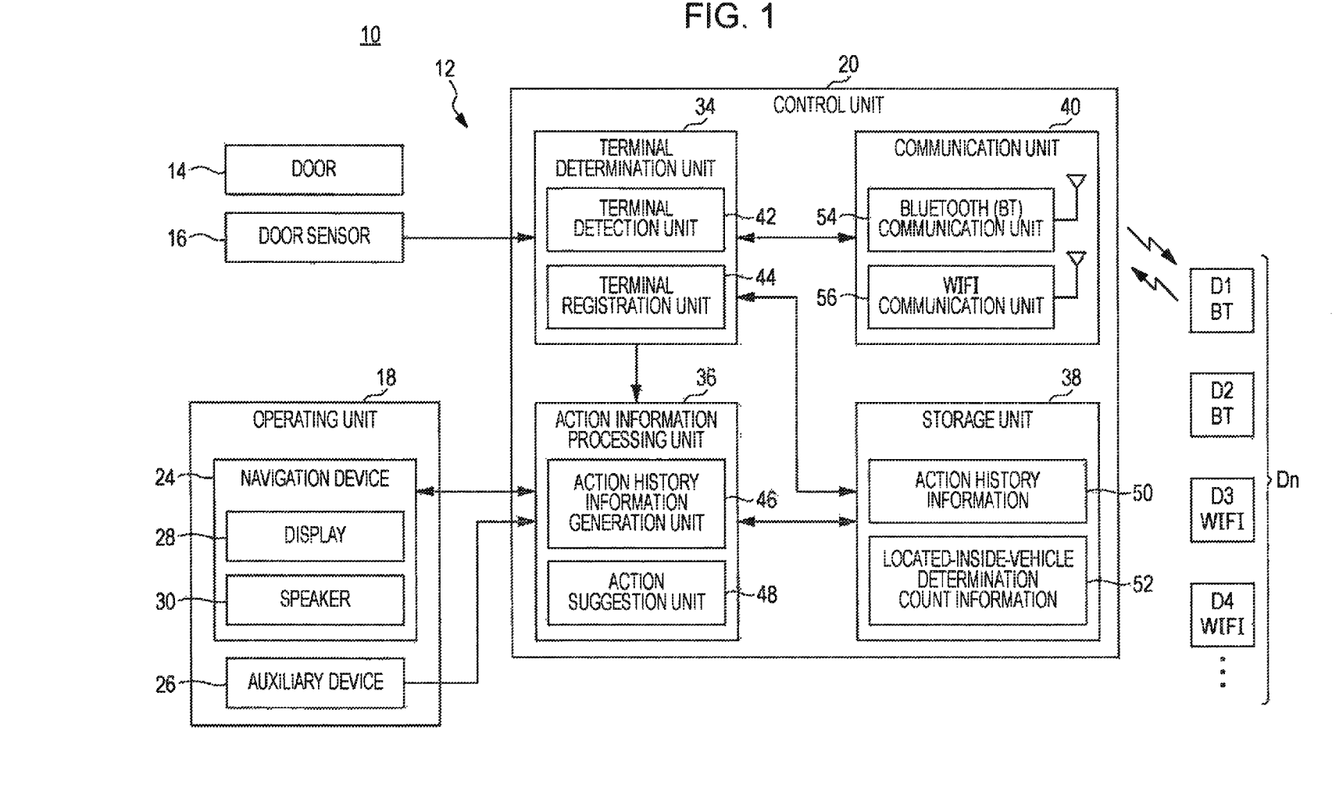
FIG. 1 is a block diagram of a vehicle action suggestion device according to the present embodiment.

As illustrated in FIG. 1, a vehicle action suggestion device 12 provided to a vehicle 10 has a door sensor 16 that detects an opening/closing operation of each door 14, an operating unit 18 that is operated by a passenger of the vehicle 10, and a control unit 20 that performs various processes in the present embodiment.

The operating unit 18 has operating devices operated by a passenger of the vehicle 10 that include, in particular, a navigation device 24 and an auxiliary device 26 in this embodiment. The navigation device 24 has a GPS antenna, a GPS receiver, an orientation sensor, a vehicle speed sensor, a navigating computer, map data, and the like. The navigation device 24 further has a display 28 that displays route guidance information and a speaker 30 that outputs voice of the route guidance information. Further, the navigation device 24 has an input device such as a touch screen, a remote controller, a switch, or the like provided to the display 28. The auxiliary device 26 includes, for example, an AV device, an air conditioner, a device for adjusting a driving mode of the vehicle 10, a device for adjusting a seat position, and the like. An operation and/or a motion provided to the navigation device 24 and the auxiliary device 26 is acquired as action information of the vehicle 10 and transmitted to the control unit 20.

The control unit 20 is formed of an ECU. The ECU is a computer including a microcomputer and has a CPU (Central Processing Unit), a memory such as a ROM (including an EEPROM) and a RAM (Random Access Memory), an input/output device such as an A/D converter and a D/A converter, and the like. When the CPU reads and executes a program stored in the ROM, the ECU functions as various units for implementing respective functions (means for implementing respective functions) such as a control unit, a computing unit, a processing unit, and the like. The ECU of the control unit 20 in the present embodiment functions as a terminal determination unit 34 and an action information processing unit 36. The control unit 20 further has a storage unit 38 and a communication unit 40. Note that the ECU may be divided into a plurality of units.

The terminal determination unit 34 has a terminal detection unit 42 and a terminal registration unit 44. The terminal detection unit 42 is configured to detect a mobile terminal(s) Dn located inside the vehicle 10 via the communication unit 40. As an example, the terminal detection unit 42 is configured to cause the communication unit 40 to perform a detection process (hereafter, referred to as scan) of a mobile terminal Dn and detect a mobile terminal Dn which responds to the scan as a mobile terminal located inside the vehicle. At this time, the terminal detection unit 42 acquires a unique identifier (hereafter, referred to as ID) of the mobile terminal Dn. The terminal registration unit 44 is configured to count the number of times for which a mobile terminal Dn has been detected by the terminal detection unit 42 and register, as a terminal inside the vehicle, a mobile terminal Dn which satisfies predetermined conditions.

The action information processing unit 36 has an action history information generation unit 46 and an action suggestion unit 48. The action history information generation unit 46 is configured to associate the ID of a mobile terminal Dn detected by the terminal detection unit 42 with action information of the vehicle 10 acquired by the operating unit 18 to generate action history information 50 and store the action history information 50 in the storage unit 38. The action suggestion unit 48 is configured to search the action history information 50 stored in the storage unit 38 for action information of the vehicle 10 associated with a mobile terminal Dn detected by the terminal detection unit 42. The action suggestion unit 48 is further configured to transmit the found action information of the vehicle 10 to the navigation device 24 of the operating unit 18 to display it on the display 28 and thereby suggest an action to a passenger.

Figure 2:
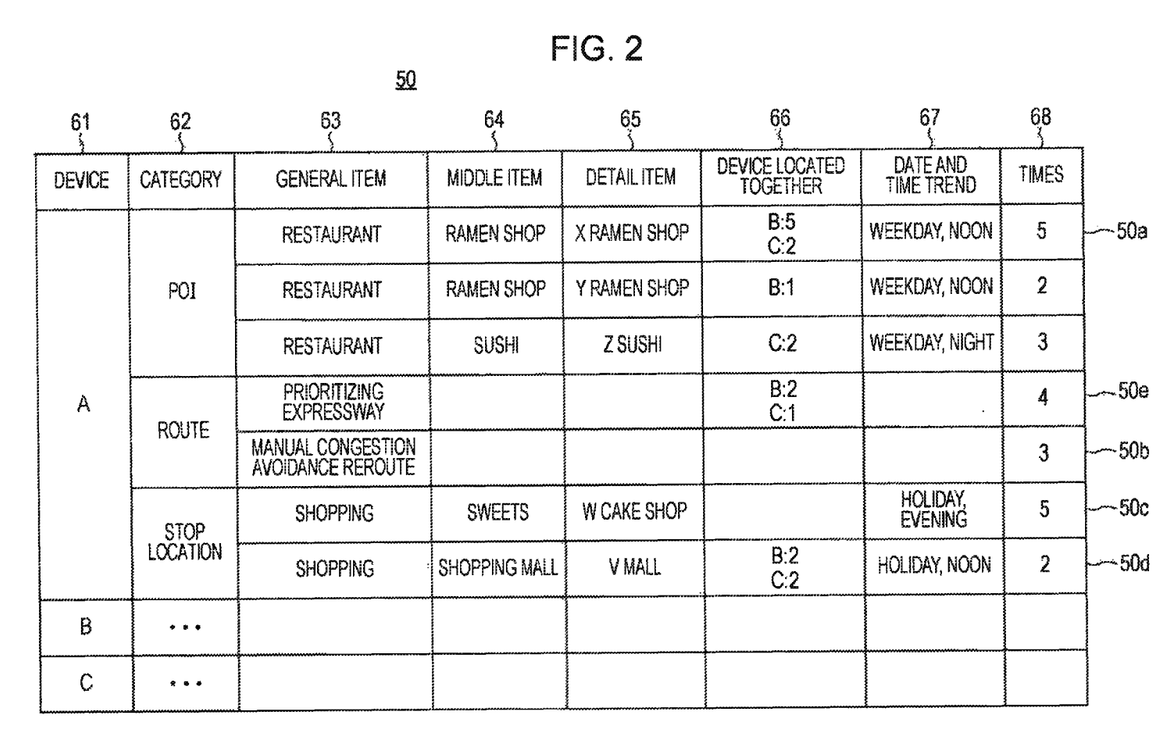
FIG. 2 is a schematic view for illustrating action history information.

The storage unit 38 has a memory and stores the action history information 50 and located-inside-vehicle determination count information 52 in the memory. The action history information 50 associates action information of the vehicle 10 with a mobile terminal Dn that was located inside the vehicle 10 at the time of the action. FIG. 2 illustrates an example of the action history information 50. The action history information 50 is formed of pieces of information such as device 61, category 62, high-level item 63, mid-level item 64, low-level item 65, device present 66, date and time pattern 67, count 68, and the like. As the device 61, the IDs of detected mobile terminals Dn are stored. As the category 62, types of action taken by the vehicle 10 are stored. As the high-level to low-level items 63 to 65, detailed information of the category 62 is stored. As the device present 66, the IDs of mobile terminals Dn detected together with the device 61 and the number of times of the mobile terminals Dn rode together with the device 61 are stored. As the date and time pattern 67, the date (weekday or holiday) and a time zone (morning, noon, evening, or night) of the action in interest are stored. As the count 68, the number of times a combination of a mobile terminal Dn stored in the device 61 and the lowest-level item of the high-level to low-level items 63 to 65 has occurred is stored. The located-inside-vehicle determination count information 52 is for recording the number of times Rn a mobile terminal Dn has been determined to be a terminal inside the vehicle, on a mobile terminal Dn basis (hereafter, referred to as located-inside-vehicle determination count Rn).

The communication unit 40 has a Bluetooth (registered trademark) (hereafter, referred to as Bt) communication unit 54 and a WiFi (registered trademark) communication unit 56. The Bt communication unit 54 has a Bt transceiver and an antenna, transmits a scan signal in response to a scan instruction outputted from the terminal detection unit 42, and receives ID information sent back from a mobile terminal Dn having the Bt function (for example, mobile terminals D1 and D2). The WiFi communication unit 56 has an WiFi transceiver and an antenna, transmits a scan signal in response to a scan instruction outputted from the terminal detection unit 42, and receives ID information sent back from a mobile terminal Dn having the WiFi function (for example, mobile terminals D3 and D4).

The mobile terminal Dn is a mobile terminal having a unique ID and provided with the Bt function and/or the WiFi function, such as a smartphone, a mobile phone, a PDA, a wearable terminal, a tablet terminal, a laptop personal computer, a portable game device, a portable music player, and the like.

Process in Vehicle Action Suggesting Device 12

The vehicle action suggestion device 12 according to the present embodiment performs in parallel an action history information storage process (FIG. 5) for associating a mobile terminal Dn located inside the vehicle 10 and an action of the vehicle 10 with each other and storing them and a vehicle action suggestion process (FIG. 6) for suggesting an action of the vehicle 10 in accordance with a mobile terminal Dn located inside the vehicle 10. During the action history information storage process and the vehicle action suggestion process, a terminal-inside-vehicle determination process (FIG. 3) for determining a mobile terminal Dn located inside the vehicle 10 is further performed. For the purpose of illustration, the terminal-inside-vehicle determination process will be described first by using FIG. 3 and FIG. 4, and then the action history information storage process and the vehicle action suggestion process will be described by using FIG. 5 and FIG. 6.

Terminal-Inside-Vehicle Determination Process

Figure 3:
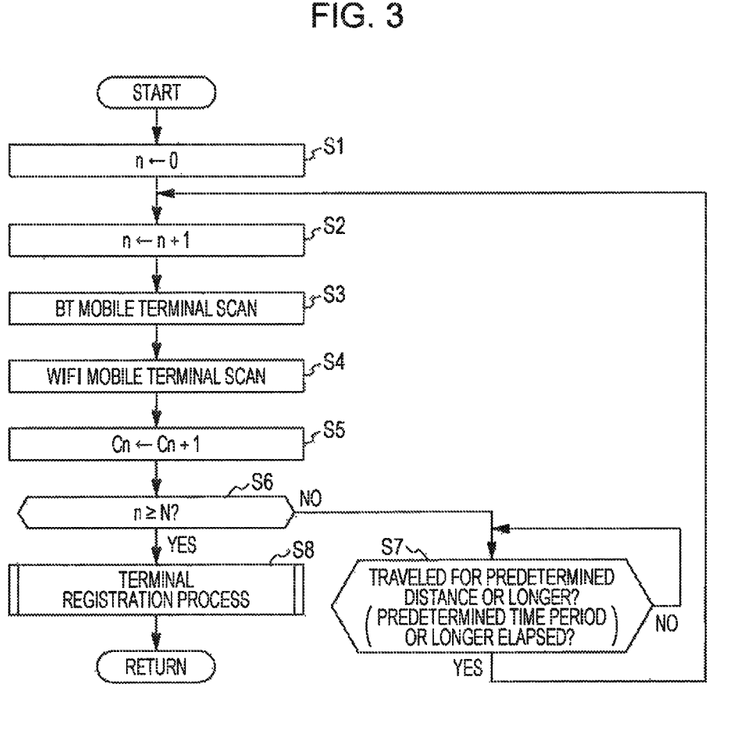
FIG. 3 is a flowchart of a terminal-inside-vehicle determination process.
Figure 4:
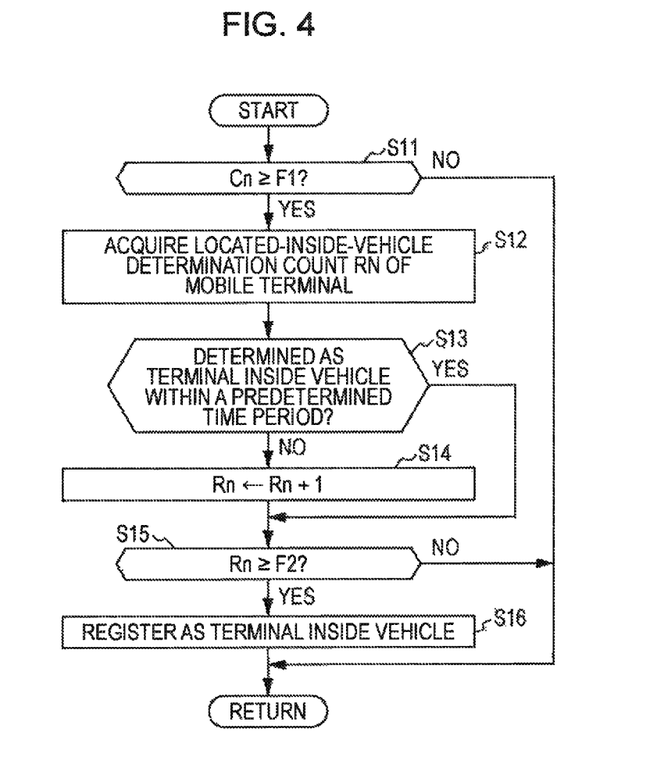
FIG. 4 is a flowchart of a terminal registration process.

The terminal-inside-vehicle determination process will be described by using FIG. 3 and FIG. 4. The terminal-inside-vehicle determination process is a process for detecting a mobile terminal Dn located inside the vehicle 10 every time an ACC is turned on and the door 14 is opened and closed and for registering such a mobile terminal Dn as a terminal inside the vehicle.

At step S1, the terminal detection unit 42 sets the number of scan times n to an initial value 0. Next, at step S2, the terminal detection unit 42 increments the number of scan times n to n+1. For example, the number of scan times is set to 1 at the first scan and then incremented to 2 at the second scan.

At step S3, the terminal detection unit 42 outputs a scan instruction to the Bt communication unit 54. The Bt communication unit 54 transmits a scan signal in response to the scan instruction. A mobile terminal Dn having the Bt function such as the mobile terminal D1 and/or D2 responds to the scan signal transmitted by the Bt communication unit 54 and sends back its ID. The Bt communication unit 54 acquires the ID of the mobile terminal Dn and transmits it to the terminal detection unit 42. In such a way, the terminal detection unit 42 detects the mobile terminal Dn (D1, D2) having the Bt function. The terminal detection unit 42 further determines the mobile terminal Dn (D1, D2) based on the ID.

At step S4, the terminal detection unit 42 outputs a scan instruction to the WiFi communication unit 56. The WiFi communication unit 56 transmits a scan signal in response to the scan instruction. A mobile terminal Dn having the WiFi function such as the mobile terminal D3 and/or D4 responds to the scan signal transmitted by the WiFi communication unit 56 and sends back its ID. The WiFi communication unit 56 acquires the ID of the mobile terminal Dn and transmits it to the terminal detection unit 42. In such a way, the terminal detection unit 42 detects the mobile terminal Dn (D3, D4) having the WiFi function. The terminal detection unit 42 determines the mobile terminal Dn (D3, D4) based on the ID.

At step S5, the terminal detection unit 42 adds one to a counter Cn of the mobile terminal Dn detected at the n-th scan. For example, when a mobile terminal Dn has already been counted, one is added to the detection time counter Cn of the mobile terminal Dn. On the other hand, when a mobile terminal Dn is detected for the first time, the detection time counter Cn of the mobile terminal Dn is established and an initial value, one, is set thereto.

At step S6, the terminal detection unit 42 determines whether or not the number of scan times n is equal to or greater than a scan termination number N. When the number of scan times n is equal to or greater than the scan termination number N (step S6: YES), the terminal detection unit 42 terminates the scan. The process then enters step S8. On the other hand, when the number of scan times n is less than the scan termination number N (step S6: NO), the terminal detection unit 42 performs a further scan. The process enters step S7.

At step S7, the terminal detection unit 42 determines whether or not the timing of the n+1-th scan has come. In the present embodiment, the timing of a scan is determined by a traveling distance of the vehicle 10. The terminal detection unit 42 determines whether or not the vehicle 10 has traveled for a predetermined distance or longer (for example, 5 km or longer) after the n-th scan. When the vehicle 10 has traveled for the predetermined distance or longer (step S7: YES), the process returns to step S2, and the terminal detection unit 42 performs the n+1-th scan. When the vehicle 10 has not traveled for the predetermined distance or longer (step S7: NO), the terminal detection unit 42 repeats the determination of step S7 until the vehicle 10 moves the predetermined distance or longer. Note that the timing of the scan may be determined from the elapsed time instead of the traveling distance of the vehicle 10.

At step S8, the terminal registration unit 44 performs a terminal registration process for each mobile terminal Dn detected by the terminal detection unit 42. The terminal registration process will be described by using FIG. 4.

At step S11, the terminal registration unit 44 determines whether or not the counter Cn of the mobile terminal Dn is equal to or greater than the first predetermined number of times F1. The Bt and WiFi radio waves can reach the outside of the vehicle 10. Thus, there is the likelihood that a mobile terminal located outside the vehicle 10 such as a mobile terminal inside a neighboring vehicle, a mobile terminal of a pedestrian, or the like may be erroneously detected during a scan of step S3 and step S4 of the terminal-inside-vehicle determination process (FIG. 3). In order to prevent such an erroneous detection of the mobile terminal, the present embodiment performs the scan of step S3 and step S4 for N times (N is greater than or equal to two) (step S6). Then, a mobile terminal Dn which has detected for the first predetermined number of times F1 or more is determined to be located inside the vehicle 10 (step S11). When the counter Cn of the mobile terminal Dn is equal to or greater than the first predetermined number of times F1 (step S11: YES), the process enters step S12. On the other hand, the counter Cn of the mobile terminal Dn is less than the first predetermined number of times F1 (step S11: NO), the mobile terminal Dn is not registered as a terminal inside the vehicle by the current terminal-inside-vehicle determination process.

At step S12, the terminal registration unit 44 searches the storage unit 38 for the located-inside-vehicle determination count information 52 by using the ID of the mobile terminal Dn and acquires the located-inside-vehicle determination count Rn of the mobile terminal Dn.

At step S13, the terminal registration unit 44 determines whether or not the mobile terminal Dn is determined to be a terminal inside the vehicle within a predetermined time period. In the present embodiment, with respect to the terminal Dn determined to be a terminal inside the vehicle within a predetermined time period (for example, within 24 hours), it is assumed that the located-inside-vehicle determination count Rn has already been counted and the located-inside-vehicle determination count Rn will not be counted at the next step S14. Whether or not the mobile terminal Dn is determined to be a terminal inside the vehicle within the predetermined time period can be determined by an updated date and time of the located-inside-vehicle determination count information 52, for example. When the mobile terminal Dn is determined to be a terminal inside the vehicle within the predetermined time period (step S13: YES), the process enters step S15. On the other hand, when the mobile terminal Dn is not determined to be a terminal inside the vehicle within the predetermined time period (step S13: NO), the process enters step S14.

At step S14, the terminal registration unit 44 adds one to the located-inside-vehicle determination count Rn of the mobile terminal Dn. Note that, since the located-inside-vehicle determination count Rn of a mobile terminal Dn of a passenger who uses the vehicle 10 for the first time does not exist in the located-inside-vehicle determination count information 52 in the storage unit 38, the located-inside-vehicle determination count Rn is not acquired in the process of step S12. In such a case, the terminal registration unit 44 establishes the located-inside-vehicle determination count Rn of the mobile terminal Dn and sets it to an initial value, one.

At step S15, the terminal registration unit 44 determines whether or not the located-inside-vehicle determination count Rn of the mobile terminal Dn is equal to or greater than the second predetermined number of times F2. A mobile terminal Dn whose located-inside-vehicle determination count Rn is small (less than the second predetermined number of times F2) is likely to be a mobile terminal of a passenger who does not usually use the vehicle 10 but happened to ride in the vehicle this time. For such a mobile terminal Dn, while counting the located-inside-vehicle determination count Rn, the terminal registration unit 44 does not register the mobile terminal Dn as a terminal inside the vehicle. When the located-inside-vehicle determination count Rn is equal to or greater than the second predetermined number of times F2 (step S15: YES), the process enters step S16. On the other hand, when the located-inside-vehicle determination count Rn is less than the second predetermined number of times F2 (step S15: NO), the mobile terminal Dn is not registered as a terminal inside the vehicle by the current terminal-inside-vehicle determination process.

At step S16, the terminal registration unit 44 registers as a terminal inside the vehicle the mobile terminal Dn whose located-inside-vehicle determination count Rn is equal to or greater than the second predetermined number of times F2. The ID of the registered mobile terminal Dn is temporarily stored and held in a storage field.

According to the terminal-inside-vehicle determination process (including the terminal registration process) described above, mobile terminals Dn located inside the vehicle 10 are detected and, among them, a mobile terminal(s) Dn which satisfies predetermined conditions is registered as a terminal inside the vehicle. The action history information storage process (FIG. 5) and the vehicle action suggestion process (FIG. 6) are then performed for the registered mobile terminal Dn. In the following, the action history information storage process and the vehicle action suggestion process will be described.

Action History Information Storage Process

Figure 5:
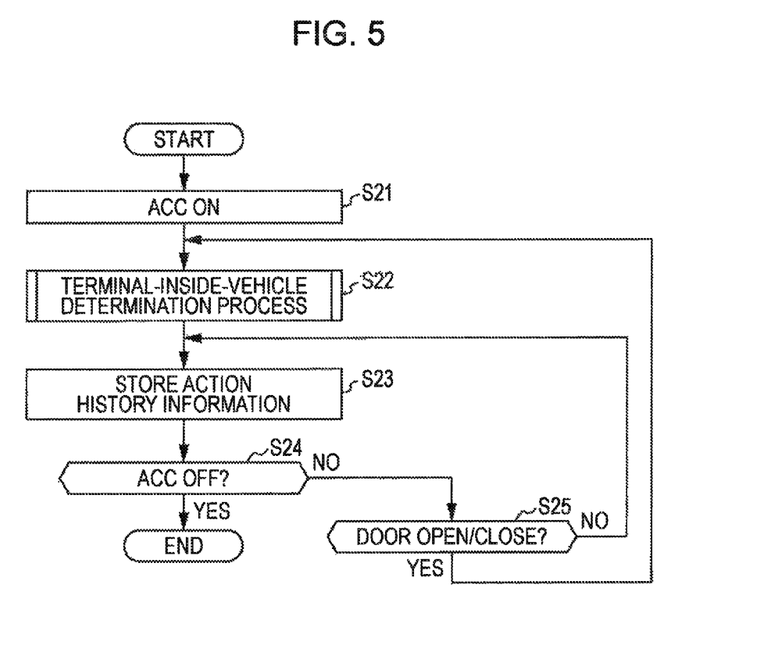
FIG. 5 is a flowchart of an action history information storage process.

The action history information storage process will be described by using FIG. 5. The action history information storage process is a process in which a mobile terminal Dn and action information of the vehicle 10 are associated with each other and stored.

At step S21, upon the ACC of the vehicle 10 being turned on, the processes on and after step S22 are performed. At step S22, the terminal determination unit 34 performs the terminal-inside-vehicle determination process (FIG. 3) described above to register the ID of a mobile terminal Dn determined to be a terminal inside the vehicle.

At step S23, the action history information generation unit 46 associates the ID of the mobile terminal Dn registered as a terminal inside the vehicle with action information of the vehicle 10 acquired through the operating unit 18 and stores them in the storage unit 38 as the action history information 50.

For example, in a situation where there are three mobile terminals Dn whose IDs are A, B, and C have been registered, let us assume that a passenger of the vehicle 10 operates the navigation device 24 and inputs a shop name "X ramen shop", its telephone number, or the like as destination information. The navigation device 24 starts route guidance to "X ramen shop". At the same time, the navigation device 24 acquires information of "X ramen shop" from map data and transmits the information to the control unit 20. The action history information generation unit 46 generates action history information 50a illustrated in FIG. 2, based on the ID of the mobile terminal Dn registered as a terminal inside the vehicle, the information of "X ramen shop" acquired from the navigation device 24, and the like.

The ID "A" is stored in the device 61 of the action history information 50a. A type of action "POI (Point Of Interest)" is stored in the category 62 of the action history information 50a. Pieces of detailed information "restaurant", "ramen", and "X ramen shop" are stored in the high-level to low-level items 63 to 65 of the action history information 50a. The IDs of other mobile terminals Dn "B:5" and "C:2" and the number of times of riding together are stored in the device present 66 of the action history information 50a. The date and time trend "weekday, noon" is stored in the date and time pattern 67 of the action history information 50a. The number of occurrence times including the current time "5" is stored in the count 68 of the action history information 50a.

While the action history information 50a illustrated in FIG. 2 is information in which the mobile terminal Dn whose ID is "A" is the subject, pieces of information in which the mobile terminals Dn whose ID are "B" and "C" are the subjects (not shown) are generated at the same time.

Further, for example, in a situation where there are the mobile terminal Dn whose ID is "A" only has been registered, let us assume that a passenger of the vehicle 10 operates the navigation device 24 to set the way of route calculation to a manual congestion avoidance reroute. The navigation device 24 calculates a route by the manual congestion avoidance reroute. At the same time, the navigation device 24 transmits to the control unit 20 the information that informs that the manual congestion avoidance reroute has been selected. The action history information generation unit 46 generates action history information 50b illustrated in FIG. 2, based on the ID of the mobile terminal Dn registered as a terminal inside the vehicle, the information acquired from the navigation device 24, and the like.

The ID "A" is stored in the device 61 of the action history information 50b. A type of action "route" is stored in the category 62 of the action history information 50b. Detailed information "manual congestion avoidance reroute" is stored in the high-level item 63 of the action history information 50b. The number of occurrence times including the current time "3" is stored in the count 68 of the action history information 50b.

Further, for example, in a situation where there are the mobile terminal Dn whose ID is "A" only has been registered, let us assume that the vehicle 10 parks in a parking lot of "W cake shop". The navigation device 24 acquires information of "W cake shop" from map data and transmits the information to the control unit 20. The action history information generation unit 46 generates action history information 50c illustrated in FIG. 2, based on the ID of the mobile terminal Dn registered as a terminal inside the vehicle, the information of "W cake shop" acquired from the navigation device 24, and the like.

The ID "A" is stored in the device 61 of the action history information 50c. A type of action "parking location" is stored in the category 62 of the action history information 50c. Pieces of detailed information "shopping", "sweets", and "W cake shop" are stored in the high-level to low-level items 63 to 65 of the action history information 50c. The date and time trend at the time "holiday, evening" is stored in the date and time pattern 67 of the action history information 50c. The number of occurrence times including the current time "5" is stored in the count 68 of the action history information 50c.

Further, while not shown in FIG. 2, the action history information 50 is generated and stored in a similar manner when the auxiliary device 26 is operated, such as when a setting temperature of the air conditioner is set, when a driving mode is set, when the radio is tuned, or the like.

The process of step S23 is repeated unless the ACC is turned off (step S24: NO) and when there is no opening/closing operation of the door 14 (step S25: NO).

At step S25, when an opening operation and/or a closing operation of the door 14 is detected by the door sensor 16 (step S25: YES), the process returns to step S22 and the terminal-inside-vehicle determination process (FIG. 3) is again performed. When the set of passengers of the vehicle 10 is changed, the door 14 is opened and closed. In the present embodiment, it is regarded that, when an opening operation and/or a closing operation of the door 14 is detected, there is a change in the set of passengers, and another terminal-inside-vehicle determination process is performed and registration of a terminal inside the vehicle is again performed.

By the action history information storage process described above, the action history information 50 is accumulated in the storage unit 38.

Vehicle Action Suggestion Process

The vehicle action suggestion process will be described by using FIG. 6. The vehicle action suggestion process is a process for suggesting an action that fits preference of a passenger of the vehicle 10. Note that, as described above, the action history information storage process (FIG. 5) and the vehicle action suggestion process (FIG. 6) are performed in parallel. Therefore, some processes of the vehicle action suggestion process (FIG. 6) are the same as some processes of the action history information storage process (FIG. 5). Specifically, the processes of step S31, step S32, step S42, and step S43 illustrated in FIG. 6 overlap the processes of step S21, step S22, step S24, and step S25 illustrated in FIG. 5.

At step S31, upon the ACC of the vehicle 10 being turned on, processes on and after step S32 are performed. At step S32, the terminal determination unit 34 performs the terminal-inside-vehicle determination process (FIG. 3) described above to register the ID of a mobile terminal Dn determined as a terminal inside the vehicle.

At step S33, the action suggestion unit 48 determines a set of mobile terminal(s) located inside the vehicle 10. The action suggestion unit 48 determines a set (a combination) of mobile terminals Dn currently located inside the vehicle 10 based on all the IDs of the mobile terminals Dn registered as a terminal inside the vehicle in the located-inside-vehicle determination process of step S32. For example, a combination of three mobile terminals Dn whose IDs are "A", "B", and "C" is determined. Upon completion of the process of step S33, the action suggestion unit 48 waits for a trigger for any of action suggestions indicated by step S34, step S36, step S38, and step S40.

At step S34, it is assumed that a passenger of the vehicle 10 starts a POI search by using the navigation device 24. The navigation device 24 transmits a signal that informs the action information processing unit 36 that the POI search has begun. At this time, the action suggestion unit 48 searches the action history information 50 in the storage unit 38 for information whose category 62 is "POI" and whose device 61 and device present 66 include three IDs "A", "B", and "C".

At step S35, the action suggestion unit 48 transmits the action history information 50 found at step S34 to the navigation device 24 as a recommended POI. For example, the information of "X ramen shop" stored in the action history information 50a illustrated in FIG. 2 is transmitted to the navigation device 24. The navigation device 24 presents the information of "X ramen shop" by using the display 28 and the speaker 30. On the other hand, when no action history information 50 that matches the condition at step S34 is found, the action suggestion unit 48 transmits a notification of there being no recommended POI to the navigation device 24. The navigation device 24 informs that there is no recommended POI by using the display 28 and the speaker 30.

At step S36, it is assumed that it is a predetermined mealtime (for example, seven o'clock in the morning, twelve o'clock noon, seven o'clock in the evening, or the like) in a clock function of the control unit 20. At this time, the action suggestion unit 48 searches the action history information 50 in the storage unit 38 for information whose high-level item 63 is "restaurant", whose date and time pattern 67 matches the current time zone, and whose device 61 and device present 66 include three IDs "A", "B", and "C".

At step S37, the action suggestion unit 48 transmits the action history information 50 found at step S36 to the navigation device 24 as a meal POI. For example, the information of "X ramen shop" stored in the action history information 50a illustrated in FIG. 2 is transmitted to the navigation device 24. The navigation device 24 presents the information of "X ramen shop" by using the display 28 and the speaker 30. On the other hand, when no action history information 50 that matches the condition at step S36 is found, the action suggestion unit 48 transmits a notification of there being no meal POI to the navigation device 24. The navigation device 24 informs that there is no meal POI by using the display 28 and the speaker 30.

At step S38, it is assumed that the navigation device 24 detects approaching to a particular location (for example, municipality). The navigation device 24 transmits information of a particular location to the action information processing unit 36. At this time, the action suggestion unit 48 searches the action history information 50 in the storage unit 38 for information whose low-level item 65 is included in the particular location and whose device 61 and device present 66 include three IDs "A", "B", and "C".

At step S39, the action suggestion unit 48 transmits the action history information 50 found at step S38 to the navigation device 24 as a favorite facility. For example, information of "V mall" stored in the action history information 50d illustrated in FIG. 2 is transmitted to the navigation device 24. The navigation device 24 displays the information of "V mall" on the display 28 and suggests "V mall" by the speaker 30. On the other hand, when no action history information 50 that matches the condition at step S38 is found, the action suggestion unit 48 transmits a notification of there being no favorite facility to the navigation device 24. The navigation device 24 displays that there is no recommended POI on the display 28 and informs that there is no recommended POI by the speaker 30.

At step S40, it is assumed that a passenger of the vehicle 10 inputs a destination by using the navigation device 24 to start a route calculation. The navigation device 24 transmits to the action information processing unit 36 a signal informing that the route calculation has begun. At this time, the action suggestion unit 48 searches the action history information 50 in the storage unit 38 for information whose category 62 is "route" and whose device 61 and device present 66 include three IDs "A", "B", and "C".

At step S41, the action suggestion unit 48 transmits the action history information 50 found at step S40 to the navigation device 24 as a preferred way of route calculation. For example, information of "prioritizing expressway" stored in the action history information 50e illustrated in FIG. 2 is transmitted to the navigation device 24. The navigation device 24 executes a route calculation according to "prioritizing expressway". On the other hand, when no action history information 50 that matches the condition at step S40 is found, the action suggestion unit 48 transmits to the navigation device 24 a notification of there being no preferred route calculation. The navigation device 24 informs that there is no preferred route calculation by using the display 28 and the speaker 30.

While step S34, step S36, step S38, and step S40 are set as a trigger for the action suggestion in the present embodiment, any other triggers of the action suggestion may be set.

Standby for step S34, step S36, step S38, and step S40 is continued unless the ACC is turned off (step S42: NO) and when there is no opening/closing operation of the door 14 (step S43: NO).

At step S43, upon an opening operation and/or a closing operation of the door 14 being detected by the door sensor 16 (step S43: YES), the process returns to step S32 and the terminal-inside-vehicle determination process (FIG. 3) is again performed. When the set of passengers of the vehicle 10 is changed, the door 14 is opened and closed. In the present embodiment, it is regarded that, when an opening operation and/or a closing operation of the door 14 is detected, there is a change in the set of passengers, and another terminal-inside-vehicle detection operation is performed to again register a terminal inside the vehicle.

With the vehicle action suggestion process described above, an action of the vehicle 10 is suggested to a passenger based on the action history information 50.

Conclusion of Present Embodiment

The vehicle action suggestion device 12 according to the present embodiment includes the terminal detection unit 42 that detects a mobile terminal Dn located inside the vehicle 10, the action history information generation unit 46 and the storage unit 38 that associate the mobile terminal Dn detected by the terminal detection unit 42 and an action of the vehicle 10 with each other and store them as the action history information 50, and the action suggestion unit 48 that searches the action history information 50 stored in the storage unit 38 for an action associated with the mobile terminal Dn detected by the terminal detection unit 42 and suggests the found action to a passenger of the vehicle 10.

The terminal detection unit 42 performs the terminal detection steps (steps S1 to S7). The action history information generation unit 46 and the storage unit 38 perform the history storage step (step S23). The action suggestion unit 48 performs the action suggesting steps (steps S35, step S37, step S39, and step S41).

According to the present embodiment, a mobile terminal Dn detected inside the vehicle 10 and an action of the vehicle 10 are associated with each other and stored as the action history information 50. Thus, when the same mobile terminal Dn is detected in the subsequent time, an optimal action can be suggested to a passenger based on the stored action history information 50. Further, according to the present embodiment, without personal information being provided after establishment of a communication line between the vehicle 10 and the mobile terminal Dn, the optimal action is suggested as long as the mobile terminal Dn located inside the vehicle 10 is detected. Thus, there is no need for establishment of a communication line between the vehicle 10 and the mobile terminal Dn resulting in less labor. Further, since personal information is not provided from the mobile terminal Dn to the vehicle 10, the personal information is protected.

The vehicle action suggestion device 12 according to the present embodiment includes the door opening/closing detection unit (the door sensor 16) that detects an opening/closing operation of the door 14 of the vehicle 10. When an opening operation and/or a closing operation of the door 14 is detected by the door opening/closing detection unit (the door sensor 16), the terminal detection unit 42 performs detection of a mobile terminal Dn.

According to the present embodiment, since detection of the mobile terminal Dn is again performed at the time of opening/closing of the door 14 when the set of passengers is likely to be changed, the mobile terminal Dn is always accurately identified allowing a more optimal action to be suggested.

The vehicle action suggestion device 12 according to the present embodiment includes the terminal registration unit 44 that registers a mobile terminal Dn. The mobile terminal detection unit 42 performs detection of a mobile terminal Dn during a predetermined traveling period (from turning on of the ACC to turning off of the ACC) on a predetermined time basis or on a predetermined traveling distance basis. The terminal registration unit 44 registers a mobile terminal Dn which has been detected by the terminal detection unit 42 for the first predetermined number of times F1 or more and whose number of being detected for the first predetermined number of times F1 or more is the second predetermined number of times F2 or more during the predetermined traveling time period (from turning on of the ACC to turning off of the ACC). The storage unit 38 stores the action history information 50 in which the mobile terminal Dn registered by the terminal registration unit 44 is associated with an action of the vehicle 10.

According to the present embodiment, a mobile terminal Dn of a passenger who happened to ride in the vehicle 10 can be excluded from the registration. As a result, an accuracy of the action history information 50 is improved and a storage capacity for storing the action history information 50 can be saved.

Other Embodiments

It should be noted that the embodiment of the present application is not limited to the embodiments described above but may of course take various configurations without departing from the scope and spirit of the present disclosure. For example, although, in the embodiment described above, the steps of step S12 to step S15 of the terminal registration process illustrated in FIG. 4 are performed in order to exclude the mobile terminal Dn of a passenger who happened to ride in the vehicle from the registration, these steps may be omitted.

Figure 6:
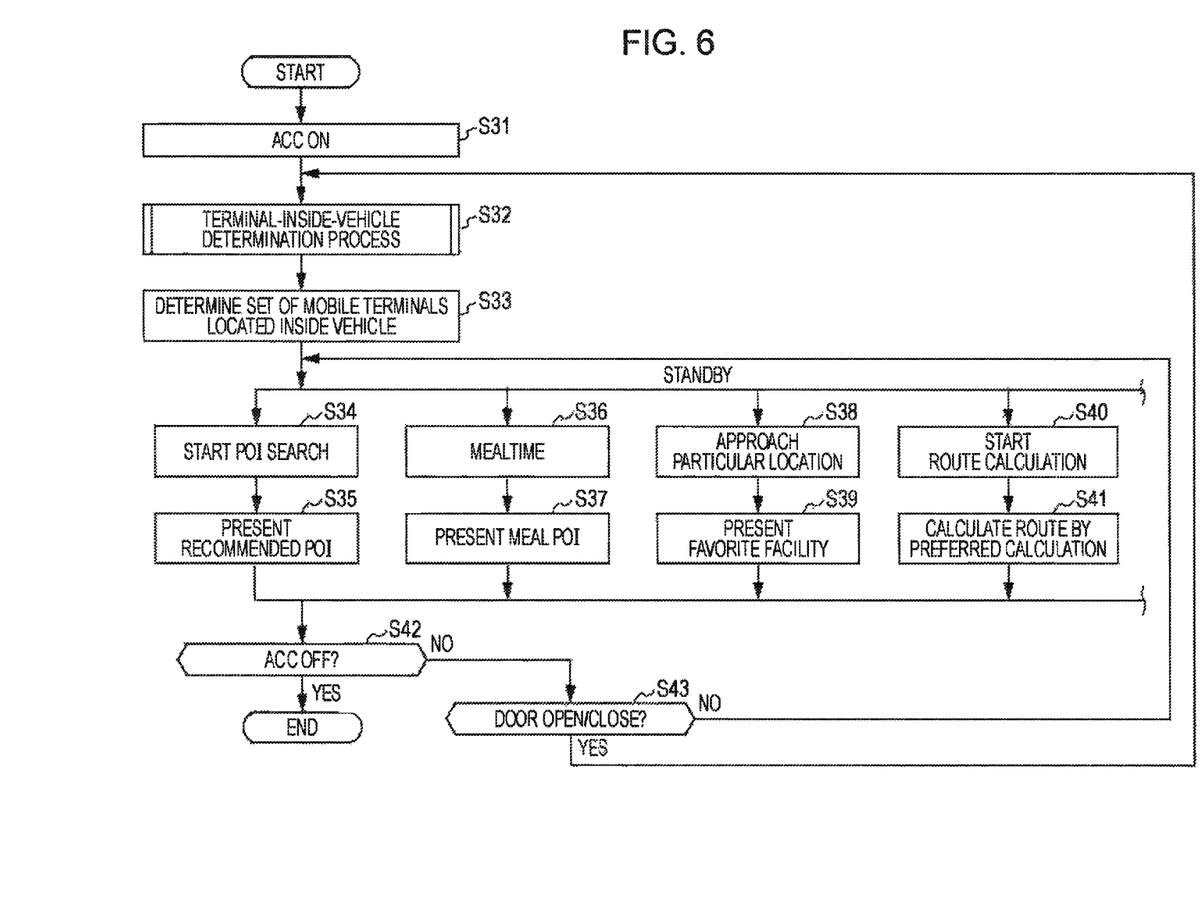
FIG. 6 is a flowchart of a vehicle action suggesting process.

In this case, in the action suggesting steps (step S35, step S37, step S39, and step S41) of the vehicle action suggestion process illustrated in FIG. 6, it is preferable to search for information including a part of the IDs of the mobile terminals Dn rather than to search for all the IDs of the mobile terminals Dn.

In the embodiment described above, the communication unit 40 and the mobile terminal Dn have the Bt function and/or the WiFi function. Without limited to the above, the communication unit 40 and the mobile terminal Dn may have a near field communication function. That is, any communication function may be utilized as long as the terminal detection unit 42 can acquire the ID of a mobile terminal Dn without establishing a communication line between the vehicle 10 and the mobile terminal Dn.

In the embodiment described above, the communication unit 40 transmits a scan signal and a mobile terminal Dn responds to the scan signal when the terminal detection unit 42 detects the mobile terminal Dn. Without limited to the above, the mobile terminal Dn may transmit a signal regardless of the scan signal, and the communication unit 40 may receive the signal. That is, any detection scheme may be utilized as long as the terminal detection unit 42 can acquire the ID of a mobile terminal Dn without establishing a communication line between the vehicle 10 and the mobile terminal Dn.

What is claimed is:

1. A vehicle action suggestion device, comprising:
a terminal detection unit configured to detect, a mobile terminal located inside a vehicle during a traveling time period, based on at least one of an elapsed time period or a traveling distance;
a terminal registration unit configured to register the mobile terminal which is detected by the terminal detection unit for a first number of times or more for a second determined number of times or more during the traveling time period;
a storage unit configured to store action history information in which the mobile terminal registered by the terminal registration unit is associated with an action of the vehicle; and an action suggestion unit configured to:
  search the action history information stored in the storage unit for the action of the vehicle associated with the mobile terminal detected by the terminal detection unit; and
  suggest the action found based on the search to a passenger of the vehicle.

2. The vehicle action suggestion device according to claim 1, further comprising a door opening/closing detection unit configured to detect at least one of an opening operation or a closing operation of a door of the vehicle,
  wherein the terminal detection unit is further configured to detect the mobile terminal based on the detection of the at least one of the opening operation or the closing operation of the door by the door opening/closing detection unit.

3. The vehicle action suggestion device according to claim 1,
  wherein information that indicates the second determined number of times is acquired from the storage unit,
  wherein the terminal registration unit is further configured to register the mobile terminal which has been detected by the terminal detection unit for the acquired second determined number of times or more during the determined traveling time period, and
  wherein the storage unit is further configured to store action history information in which the mobile terminal registered by the terminal registration unit is associated with the action of the vehicle.

4. The vehicle action suggestion device according to claim 1, further comprising a display device configured to display the suggested action.

5. The vehicle action suggestion device according to claim 1, further comprising a speaker configured to output the suggested action.

6. A vehicle action suggestion method, comprising:
  detecting a mobile terminal located inside a vehicle during a traveling time period, based on at least one of a time period or a traveling distance;
  registering the mobile terminal which is detected for a first number of times or more for a second determined number of times or more during the traveling time period;
  associating the registered mobile terminal with an action of the vehicle to generate action history information and storing the action history information;
  searching the stored action history information for the action of the vehicle associated with the detected mobile terminal; and
  suggesting the action found based on the search to a passenger of the vehicle.

7. The vehicle action suggestion method according to claim 6, further comprising detecting at least one of an opening operation or a closing operation of a door of the vehicle,
  wherein the mobile terminal is detected based on the at least one of the opening operation or the closing operation of the door.

8. The vehicle action suggestion method according to claim 6,
  wherein information that indicates the second determined number of times is acquired from a storage unit,
  wherein the mobile terminal is registered for the acquired second determined number of times or more during the determined traveling time period, and
  wherein the registered mobile terminal is associated with the action of the vehicle to generate action history information and to store the action history information.

* * * * *